US008448548B2

United States Patent
Kobayashi et al.

(10) Patent No.: US 8,448,548 B2
(45) Date of Patent: May 28, 2013

(54) BOLT TIGHTENING METHOD, BOLT TIGHTENING DEVICE, BOLT SUPPLYING METHOD, AND BOLT SUPPLYING DEVICE

(75) Inventors: Shinobu Kobayashi, Tochigi (JP); Tetsuo Ishii, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/920,207

(22) PCT Filed: Mar. 13, 2009

(86) PCT No.: PCT/JP2009/055551
§ 371 (c)(1),
(2), (4) Date: Aug. 30, 2010

(87) PCT Pub. No.: WO2009/113739
PCT Pub. Date: Sep. 17, 2009

(65) Prior Publication Data
US 2011/0030513 A1 Feb. 10, 2011

(30) Foreign Application Priority Data

Mar. 13, 2008 (JP) .................. 2008-064041
Mar. 13, 2008 (JP) .................. 2008-064042
Mar. 13, 2008 (JP) .................. 2008-064043

(51) Int. Cl.
*B25B 13/48* (2006.01)
*B25B 13/00* (2006.01)
*B25B 23/00* (2006.01)
*B25B 9/00* (2006.01)
*B25B 17/00* (2006.01)
*B25B 13/50* (2006.01)
*B23Q 17/00* (2006.01)
*B23Q 7/10* (2006.01)
*B23P 11/00* (2006.01)
*B23P 17/00* (2006.01)

(52) U.S. Cl.
USPC ............ 81/57.36; 81/55; 81/124.4; 81/57.22; 81/13; 81/57.16; 81/57.35; 81/57.4; 29/407.09; 29/407.1; 29/525.02; 29/525.11; 29/811.2

(58) Field of Classification Search
USPC ........... 81/55, 57.36, 124.4, 57.22, 13, 57.16, 81/57.35, 57.4; 29/407.09, 407.1, 525.02, 29/525.11, 798, 811.2
See application file for complete search history.

(56) References Cited

U.S. PATENT DOCUMENTS
710,676 A * 10/1902 Finn .............................. 81/57.36
(Continued)

FOREIGN PATENT DOCUMENTS
JP 58-137582 8/1983
(Continued)

*Primary Examiner* — Monica Carter
*Assistant Examiner* — Danny Hong
(74) *Attorney, Agent, or Firm* — Rankin, Hill & Clark LLP (57) ABSTRACT

A tightening head (1) is provided with at least two sockets ($4_i$, $4_{ii}$) which are alternatively connected to an output shaft of a nut runner (3), a socket replacing mechanism (6) and a bolt supplying mechanism (7). The socket replacing mechanism (6) is provided with a moving mechanism (61) and a posture changing mechanism (64). The moving mechanism (61) moves each socket ($4_i$, $4_{ii}$) between a using position where the socket ($4_i$, $4_{ii}$) agrees with an axis of the output shaft of the nut runner (3) and a waiting position which is distant from the axis. The posture changing mechanism (64) changes a posture of each socket ($4_i$, $4_{ii}$) to an upward posture corresponding to the waiting position and to a tightening posture corresponding to the using position. The bolt supplying mechanism 7 is provided with bolt magazines ($8_i$, $8_{ii}$) and bolt holding mechanism ($9_i$, $9_{ii}$).

During a bolt tightening step is executed by one socket in the using position, the bolt (B) is supplied to the other socket in the waiting position.

8 Claims, 6 Drawing Sheets

U.S. PATENT DOCUMENTS

| | | | |
|---|---|---|---|
| 5,402,695 A * | 4/1995 | Hornung | 81/434 |
| 7,055,408 B2 * | 6/2006 | Sasaki | 81/54 |
| 7,082,857 B1 * | 8/2006 | Hoffman | 81/57.16 |
| 7,472,475 B2 * | 1/2009 | Lutz et al. | 29/791 |

FOREIGN PATENT DOCUMENTS

| | | |
|---|---|---|
| JP | 58-160030 | 9/1983 |
| JP | 62-050060 | 3/1987 |
| JP | 64-078730 | 3/1989 |
| JP | 94-078730 | 3/1989 |
| JP | 04-269132 | 9/1992 |
| JP | 05-057537 | 3/1993 |
| JP | 2000-271754 A | 10/2000 |
| JP | 2002-046033 | 2/2002 |

* cited by examiner

BOLT TIGHTENING METHOD, BOLT TIGHTENING DEVICE, BOLT SUPPLYING METHOD, AND BOLT SUPPLYING DEVICE

TECHNICAL FIELD

The present invention relates to a method of tightening bolts for tightening a plurality of bolts to a work. In addition, the present invention also relates to a device of tightening bolts used for executing this method.

Moreover, the present invention relates to a method of supplying a bolt to a socket provided in a bolt tightening device, and a device of supplying a bolt used for executing this method.

BACKGROUND ART

A bolt tightening device is configured in such a manner that a bolt held by a bolt holding portion provided at a forward end of a socket connected to an output shaft of a nut runner is tightened to a work by a rotation of the socket caused by an action of the nut runner.

According to a conventional case in which a plurality of bolts are tightened by using one nut runner, the following two steps are repeated. In the first step, the nut runner is moved to a place where the bolt is supplied and then the bolt is supplied to a bolt holding portion provided at a forward end portion of a socket connected to an output shaft of the nut runner. In the second step, the nut runner is moved to a work side and the bolt held by the bolt holding portion is tightened to the work. According to this method, each time one bolt is tightened, the nut runner must be reciprocated from the work side to the bolt supplying place. Therefore, an efficiency is deteriorated. In this connection, it is possible to enhance the efficiency by using a plurality of nut runners. However, when a plurality of nut runners are provided, the equipment investment is increased.

Moreover, the following bolt tightening device is known.

The bolt tightening device includes: a slider which advances in a work direction together with a nut runner and stops at a predetermined position; and a bolt catcher pivotally supported by the slider. Concerning this bolt tightening device, for example, refer to Patent Document 1. In this bolt tightening device, a bolt is dropped from an upper portion of the bolt catcher through a pipe and then the bolt catcher is rotated so that the bolt can be concentric with a socket of the bolt runner. When the nut runner is advanced to the work direction under this condition, the socket is inserted into the bolt catcher so as to deliver the bolt to the socket.

[Patent Document 1] JP-A-64-078730

When this bolt tightening device is used, it becomes unnecessary to move the nut runner to the bolt supply portion, which is apart from the work, after a completion of tightening the bolt. Accordingly, the efficiency can be enhanced. However, in this bolt tightening device, an auxiliary device for supplying a bolt, which includes a slider and a bolt catcher, is arranged in the neighborhood of the forward end of the socket of the nut runner. Therefore, this auxiliary device interferes with the work and it becomes impossible to tighten the bolt.

DISCLOSURE OF INVENTION

One or more embodiments of the present invention provide a bolt tightening method and a bolt tightening device used for executing a method capable of efficiently executing a bolt tightening work without arranging an auxiliary device for supplying a bolt in a neighborhood of a forward end of a socket of a nut runner.

In accordance with one or more embodiments of the present invention, in a method of tightening bolts in which a plurality 1.5 of bolts (B) are tightened to a work (W) by using a tightening head (1) on which a nut runner (3) is mounted, the method is provided with: a bolt supplying preparing step of releasing a connection between a socket portion (4i, 4ii) and an output shaft (3a) of the nut runner (3), and changing a posture of the socket portion (4i, 4ii) to an upward posture in which a bolt holding portion (44) provided at a forward end of the socket portion (4i, 4ii) directs upward; a bolt supplying step of grasping one of the plurality of bolts (B) held in a bolt magazine (8i, 8ii) mounted on the tightening head (1) by a bolt grasping mechanism (9i, 9ii) mounted on the tightening head (1), and inserting the one of bolts (B) from an upper side into the bolt holding portion (44) of the socket portion (4i, 4ii) by the bolt grasping mechanism (9i, 9ii), after the bolt supplying preparing step; a bolt tightening preparing step of changing the posture of the socket portion (4i, 4ii) to a tightening posture in which the socket portion (4i, 4ii) is laid along an axis of the output shaft (3a) of the nut runner (3), and connecting the socket portion (4i, 4ii) with the output shaft (3a) of the nut runner (3), after a completion of the bolt supplying step; and a bolt tightening step of rotating the socket portion (4i, 4ii) by the nut runner (3), and tightening the bolt (B) held by the bolt holding portion (44) of the socket portion (4i, 4ii) to the work, after a completion of the bolt tightening preparing step.

According to the method, a plurality of bolts to be tightened to the work are held by the bolt magazine mounted on the tightening head and the bolts are supplied from the bolt magazine to the socket. Therefore, it is unnecessary that the tightening head is moved to the bolt supplying place after the completion of the bolt tightening step so as to supply the bolt to the socket.

Accordingly, while the tightening head is being located on the work side, the bolt tightening work can be continued. Therefore, a plurality of bolts can be efficiently tightened to the work.

Even when the tightening posture is a downward posture in which it is difficult to stably supply a bolt to the bolt holding portion at a forward end of the socket, since the posture of the socket is directed upward, the bolt can be stably supplied from an upper portion to the bolt holding portion at the forward end of the socket. Therefore, it is possible to reduce a time loss caused when the bolt is erroneously supplied. Further, it is unnecessary to arrange an auxiliary device for supplying a bolt in the neighborhood of the forward end of the socket connected to the output shaft of the nut runner. Accordingly, it is possible to prevent the occurrence of such a problem that the bolt can not be tightened being obstructed by a interference of the auxiliary device with the work.

Moreover, in accordance with one or more embodiments of the present invention, a device of tightening bolts is provided with: a tightening head (1) on which a nut runner (3) is mounted; an attaching and detaching mechanism (5) for detachably connecting a socket portion (4i, 4ii) with an output shaft (3a) of the nut runner (3); a posture changing mechanism (64) for changing a posture of the socket portion (4i, 4ii), which has been disconnected from the output shaft (3a) of the nut runner (3), between an upward posture in which a bolt holding portion (44) provided at a forward end of the socket portion (4i, 4ii) directs upward and a tightening posture in which the socket portion (4i, 4ii) is laid along an axis of the output shaft (3a) of the nut runner (3); and a bolt supplying mechanism (7) having a bolt magazine (8i, 8ii) for holding a plurality of bolts (B) and also having a bolt grasping mechanism (9i, 9ii) for grasping one bolt (B) held by the bolt magazine (8i, 8ii) and for inserting the bolt (B) from an upper side into the bolt holding portion (44) of the socket portion (4i, 4ii) at the upward posture.

According to the device, the bolt supplying preparing step and the bolt tightening preparing step of the method of the embodiments of the present invention may be executed by the attaching and detaching mechanism and the posture changing mechanism. Further, the bolt supplying step of the embodiments of the present invention may be executed by the bolt supplying mechanism. Accordingly, the method of the embodiments of the present invention can be positively execute.

Further, in the method of the above embodiments of the invention, the socket portion (4i, 4ii) may include at least two sockets (4i, 4ii) provided in the tightening head (1), and the two sockets (4i, 4ii) are capable of alternatively being connected to the output shaft (3a) of the nut runner (3), and the method may further be provided with: a step of executing one cycle of working steps in order with respect to each socket (4i, 4ii), wherein the one cycle includes the bolt preparing step, the bolt supplying step, the bolt tightening preparing step and the bolt tightening step; a step of changing a posture of each socket (4i, 4ii) to the upward posture, while each socket (4i, 4ii) is moving to a waiting position apart from an axis of the output shaft (3a) of the nut runner (3), in the bolt supplying preparing step for each socket (4i, 4ii); a step of changing the posture of each socket (4i, 4ii) to the tightening posture, while each socket (4i, 4ii) is moving from the waiting position to a using position agreeing with the axis of the output shaft (3a) of the nut runner (3), in the bolt tightening preparing step for each socket (4i, 4ii); and a step of simultaneously executing the bolt supplying preparing step for one socket and the bolt tightening preparing step for another socket.

Due to the above constitution, in the bolt tightening step in which the bolt held by the socket connected to the output shaft of the socket runner is tightened to the work, the bolt can be supplied to another socket existing at the waiting position. Further, after the bolt tightening step has been finished, simultaneously when the socket connected to the output shaft of the nut runner is moved from the using position to the waiting position, another socket is moved from the waiting position to the using position. Accordingly, the socket can be efficiently replaced. Due to the above constitution, a cycle time of tightening one bolt can be shortened and a plurality of bolts can be more efficiently tightened to the work.

In order to execute this method, in the device of the above embodiments, the socket portion (4i, 4ii) may include at least two sockets (4i, 4ii) which are capable of alternatively being connected to the output shaft (3a) of the nut runner (3), the device may further be provided with: a moving mechanism (61) for moving each socket (4i, 4ii) between a using position agreeing with an axis of the output shaft (3a) of the nut runner (3) and a waiting position apart from the axis;

a posture changing mechanism (64); and a socket replacing mechanism (6) for changing each socket (4i, 4ii) into an upward posture by the posture changing mechanism (64) when the each socket (4i, 4ii) is moved to the waiting position and for changing each socket (4i, 4ii) into a tightening posture by the posture changing mechanism (6) when the each socket (4i, 4ii) is moved to the using position, the attaching and detaching mechanism (5) may be configured so that the socket (4i, 4ii) at the using position and the output shaft (3a) of the nut runner (3) is detachably connected to each other, the bolt grasping mechanism (9i, 9ii) may be configured so that a bolt (B) is inserted from the upper side into the bolt holding portion (7) of the socket (4i, 4ii) at the waiting position, and the socket replacing mechanism (6) may be configured so that, when one socket moves to the waiting position, another socket simultaneously move to the using position.

In the above method, the sockets (4i, 4ii) may have respective waiting positions, and the sockets (4i, 4ii) may have respective bolt magazines (8i, 8ii) and the bolt grasping mechanisms (9i, 9ii) on the tightening head (1). The bolt supplying step for each socket may be provided with: a bolt holding preparing step of moving each bolt magazine (8i, 8ii) corresponding to the each socket (4i, 4ii) to a bolt delivering position at which one of the plurality of bolts (B) held by the magazine (8i, 8ii) is grasped by each bolt grasping mechanism (9i, 9ii) corresponding to the each socket (4i, 4ii); a bolt grasping step of grasping the bolt (B) by the each bolt grasping mechanism (9i, 9ii); a magazine withdrawal step of moving the each bolt magazine (8i, 8ii) to a withdrawal position apart from a downward moving locus of the each bolt grasping mechanism (9i, 9ii); and a bolt insertion step of moving the each bolt grasping mechanism (9i, 9ii) downward and inserting the bolt (B) into a bolt holding portion of the each socket (4i, 4ii) existing at each waiting position.

Due to the above constitution, only when each bolt grasping mechanism is linearly moved in the vertical direction, the bolt can be inserted into the bolt holding portion of each socket without causing interference with each bolt magazine.

Accordingly, as compared with a case in which the bolt grasping mechanism is moved in a direction except for the vertical direction so that the interference with the bolt magazine can be avoided, the positional accuracy of the bolt grasping mechanism can be easily ensured. Accordingly, the bolt can be stably supplied to the socket.

Further, in the device of the above embodiments, the socket replacing mechanism (6) may be configured so that the sockets (4i, 4 ii) move to their respective waiting positions, the sockets (4i, 4ii) may have respective bolt magazines (8i, 8ii) and respective bolt grasping mechanisms (9i, 9ii), each bolt grasping mechanism (9i, 9ii) may linearly move in a vertical direction on the axis of a corresponding socket (4i, 4ii) when the corresponding socket (4i, 4ii) locates at the waiting position, and each bolt magazine (8i, 8ii) may move between a bolt delivering position, at which one of the plurality of bolts held by the magazine (8i, 8ii) can be grasped by the bolt grasping mechanism (9i, 9ii), and a withdrawal position which is apart from a downward moving locus of the corresponding bolt grasping mechanism (9i, 9ii).

In the method of the above embodiments, the bolt holding preparing step in the bolt supplying step for one socket and the magazine withdrawal step in the bolt supplying step for another socket may simultaneously be executed. Moreover, in the method of the above embodiments, the bolt grasping step in the bolt supplying step for one socket and the bolt insertion step in the bolt supplying step for another socket may simultaneously be executed. Due to this constitution, a cycle time of tightening a bolt can be further shortened.

In the device of the above embodiments, the bolt magazines (8i, 8ii) may be connected to each other and when one bolt magazine is moved to the bolt delivering position, another bolt magazine may be moved to the withdrawal position. Due to the above constitution, the bolt holding preparing step in the bolt supplying step for one socket and the magazine withdrawal step in the bolt supplying step for another socket can be simultaneously executed by a simple structure.

Moreover, in accordance with one or more embodiments of the invention, in a method of tightening bolts for tightening a plurality of bolts (B) to a work (W) by using at least two sockets (4i, 4ii) which are alternatively connected to an output shaft (3a) of a nut runner (3), the method is provided with: a bolt supplying preparing step; a bolt tightening preparing step; and a step of simultaneously executing the bolt supplying preparing step for one socket and the bolt tightening preparing step for another socket. The bolt supplying preparing step includes: releasing a socket (4i, 4ii) connected to the output shaft (3a) of the nut runner (3) from the output shaft (3a) of the nut runner (3); moving the socket (4i, 4ii) to a waiting position apart from an axis of the output shaft (3a) of the nut runner (3), and changing a posture of the socket (4i, 4ii) to an upward posture in which a bolt holding portion (44) of a forward end of the socket (4i, 4ii) directs upward. The bolt tightening preparing step includes: moving the socket (4i, 4ii) to a using position agreeing with the axis of the output shaft (3a) of the nut runner (3); changing the posture of the socket (4i, 4ii) to a tightening posture in which the socket (4i, 4ii) is laid along the axis; and connecting the socket (4i, 4ii) to the output shaft (3a) of the nut runner (3).

The bolt tightening method may further provided with: a bolt supplying step of supplying the bolt (B) from an upper side to the bolt holding portion (44) of the socket (4i, 4ii) at the waiting position, after a completion of the bolt supplying preparing step; and a bolt tightening step of rotating the socket (4i, 4ii) by the nut runner (3) and of tightening the bolt (B) held by the socket holding portion (44) to the work (W), after a completion of the bolt tightening preparing step.

According to the bolt tightening method of the above embodiments of the present invention, in the bolt tightening step in which the bolt held by the socket, which is connected to the output shaft of the nut runner, is tightened to the work, the bolt can be supplied to the other socket existing at the waiting position. Therefore, it is unnecessary that the nut runner is moved to a bolt supplying position after the bolt tightening step has been completed and that the bolt is supplied to the socket. Further, after the bolt tightening step has been completed, the socket connected to the output shaft of the nut runner is moved from the using position to the waiting position and at the same time the other socket is moved from the waiting position to the using position. Therefore, the socket can be efficiently replaced. Due to the foregoing, a cycle time of tightening one bolt can be reduced.

Therefore, a plurality of bolts can be highly efficiently tightened to the work.

Even when the tightening posture is a horizontal posture or a downward posture in which it is difficult to stably supply a bolt to the bolt holding portion at a forward end of the socket, since the posture of the socket is directed upward at the waiting position, the bolt can be stably supplied from an upper portion to the bolt holding portion at the forward end of the socket. Therefore, it is possible to reduce a loss of time caused when a bolt is erroneously supplied. Further, since the bolt is supplied to the socket existing at the waiting position, it is unnecessary to arrange an auxiliary device for supplying a bolt in the neighborhood of the forward end of the socket connected to the output shaft of the nut runner. Accordingly, it is possible to prevent the occurrence of such a problem that the bolt can not be tightened being obstructed by interference of the auxiliary device with the work.

Moreover, in accordance with one or more embodiments of the present invention, a device of tightening bolts is provided with: a nut runner (3); a least two sockets (4i, 4ii) alternatively connected to an output shaft (3a) of the nut runner (3); a socket replacing mechanism (6) for moving each socket (4i, 4ii) to a using position at which the socket (4i, 4ii) agrees with an axis of the output shaft (3a) of the nut runner (3), and for moving each socket (4i, 4ii) to a waiting position which is apart from the axis, for changing a posture of each socket (4i, 4ii) to an upward posture in which a bolt holding portion (44) of a forward end of the socket (4i, 4ii) directs upward when the socket (4i, 4ii) is moved to the waiting position, and for changing a posture of each socket (4i, 4ii) to a tightening posture in which the socket (4i, 4ii) is laid along the axis of the output shaft (3a) of the nut runner (3) when the socket (4i, 4ii) is moved to the using position; and an attaching and detaching mechanism (5) for detachably connecting the socket (4i, 4ii) at the using position with the output shaft (3a) of the nut runner (3). In the device, the socket replacing mechanism (6) simultaneously moves one socket (4i, 4ii) to the waiting position and the other socket (4i, 4ii) to the using position.

According to the bolt tightening device of the above embodiments of the present invention, when the attaching and detaching mechanism and the socket replacing mechanism are acted, the bolt supplying preparing step for one socket and the bolt tightening preparing step for the other socket can be simultaneously carried out. While one bolt held by the socket connected to the output shaft of the nut runner is being tightened to the work, another bolt can be supplied to the socket existing at the waiting position by the bolt supplying mechanism. That is, the bolt tightening method of the present invention can be positively executed.

The bolt tightening device may further be provided with a base (2) on which the nut runner (3) is mounted. The socket replacing mechanism (6) may include: a moving table (61) supported on the base (2), the moving table (61) being capable of reciprocating in a direction perpendicular to the axis of the output shaft (3a) of the nut runner (3); and a posture changing mechanism (64). Each socket (4i, 4ii) may be pivotally supported by the moving table (61) so that each socket (4i, 4ii) is movable between the upward posture and the tightening posture at a base end portion of the socket (4i, 4ii), so that one socket (4i, 4ii) moves to the waiting position apart from the axis of the output shaft (3a) of the nut runner (3) and the other socket (4i, 4ii) moves to the using position when the moving table (61) is moved forward, and so that the one socket (4i, 4ii) moves to the using position and the other socket (4i, 4ii) moves to the waiting position apart from the axis of the output shaft (3a) of the nut runner (3) when the moving table is moved backward. The posture changing mechanism (64) may include a cam mechanism (64) formed out of a cam (65i, 65ii) fixed onto the base (2) and a cam follower (66) connected to each socket (4i, 4ii) and engaged with the cam (65i, 65ii), the cam (65i, 65ii) changes a posture of each socket (4i, 4ii) to an upward posture when the socket (4i, 4ii) is moved from the using position to the waiting position, the cam (65i, 65ii) changes a posture of each socket (4i, 4ii) to a tightening posture when the socket (4i, 4ii) is moved from the waiting position to the using position.

Due to the above constitution, only when the moving table is reciprocated, one socket can be moved to the waiting position and a posture of the socket can be changed to an upward posture and the other socket can be moved to the using position and a posture of the socket can be changed to a tightening posture. Therefore, only when a drive source for reciprocating the moving table is provided, it is unnecessary to provide a drive source for changing a posture of each socket. Accordingly, the manufacturing cost can be reduced.

The device of the above embodiments may further be provided with: a bolt supplying mechanism (7) for supplying bolts (B) from an upper side to the bolt holding portion (44) of the socket (4i, 4ii) at the waiting position.

Moreover, one or more embodiments of the present invention provide a method and a device for supplying a bolt in a bolt tightening device in which it is possible to stably provide the bolt to a socket without arranging an auxiliary device for supplying the bolt in the neighborhood of a forward end of a socket.

In accordance with one or more embodiments of the present invention, a method of supplying a bolt (B) to a socket (4i, 4ii) provided in a bolt tightening device is provided with: a bolt supplying preparing step of changing a posture of the socket (4i, 4ii) from a predetermined tightening posture to an upward posture in which a bolt holding portion (44) provided at a forward end of the socket (4i, 4ii) directs upward; and a bolt supplying step of grasping one of a plurality of bolts (B) held by a bolt magazine (8i, 8ii) arranged at a position higher than the bolt holding portion (44) of the socket (4i, 4ii) in the upward posture, and inserting the bolt (B) into the bolt holding portion (44) of the socket (4i, 4ii). The bolt supplying step includes: a bolt holding preparing step of moving the bolt magazine (8i, 8ii) to a bolt delivering position where one of the plurality of bolts held by the magazine can be grasped by the bolt grasping mechanism (9i, 9ii); a bolt grasping step of grasping the bolt (B) by the bolt grasping mechanism (9i, 9ii); a magazine withdrawal step of moving the bolt magazine (8i, 8ii) to a withdrawal position apart from a downward moving locus of the bolt grasping mechanism (9i, 9ii); and a bolt insertion step of moving the bolt grasping mechanism (9i, 9ii) downward and inserting the bolt (B) from an upper side into the bolt holding portion (44) of the socket (4i, 4ii) in the upward posture, after a completion of the bolt supplying preparing step.

In accordance with one or more embodiments of the present invention, in a bolt supplying device for supplying a bolt (B) to a socket (4i, 4ii) provided in a bolt tightening device in which a posture of the socket (4i, 4ii) is changeable from a predetermined tightening posture to an upward posture in which a bolt holding portion (44) on a forward end of the socket is directs, the device is provided with: a bolt magazine (8i, 8ii) configured to hold a plurality of bolts (B) therein and arranged at a position higher than the bolt holding portion (44) of the socket (4i, 4ii) in the upward posture; and a bolt grasping mechanism (9i, 9ii) for grasping one of the bolts (B) held by the bolt magazine (8i, 8ii) and inserting the bolt (B) from an upper side into the bolt holding portion (44) of the socket (4i, 4ii) in the upward posture. The bolt grasping mechanism (9i, 9ii) is linearly movable in a vertical direction on an axis of the socket (4i, 4ii) in the upward posture. The bolt magazine (8i, 8ii) is movable between a bolt delivering position at which one of the bolts (B) held by the magazine is grasped by the bolt grasping mechanism (9i, 9ii) and a withdrawal position which is apart from a downward moving locus of the bolt grasping mechanism (9i, 9ii).

According to the bolt supplying method and device of the above embodiments of the present invention, even when a tightening posture is directed horizontal or downward so that it is difficult to stably supply a bolt to the bolt holding portion of the socket, the bolt can be stably supplied from an upper portion to the bolt holding portion when a posture of the socket is made to be upward at the time of supplying the bolt. Further, when the bolt magazine is moved to a bolt delivering position and the bolt is grasped by the bolt grasping mechanism and then the bolt magazine is moved to the withdrawal position, only when the bolt grasping mechanism is linearly moved downward, the bolt can be inserted into the bolt holding portion of the socket without causing interference with the bolt magazine. Therefore, as compared with a case in which the bolt grasping mechanism is moved in a direction except for the vertical direction so that the interference with the bolt magazine can be avoided, the positional accuracy of the bolt grasping mechanism can be easily ensured and the bolt can be stably, positively supplied to the socket.

After the bolt has been supplied, a posture of the socket is made to be a tightening posture so as to tighten the bolt. At this time of tightening the bolt, since no auxiliary device for supplying the bolt is provided in the neighborhood of the socket, it is possible to avoid the occurrence of such a problem that the bolt can not be tightened by the interference the auxiliary device with a work.

Other aspects and advantages of the invention will be apparent from the following description, the drawings and the claims.

EXPLANATION OF REFERENCE

W . . . Work
B . . . Bolt
1 . . . Tightening head
3 . . . Nut runner
3a . . . Output shaft
$4_i, 4_{ii}$ . . . Socket
44 . . . Bolt holding portion
5 . . . Attaching and detaching mechanism
6 . . . Socket replacing mechanism
61 . . . Moving table
64 . . . Cam mechanism (Posture changing mechanism)
$65_i, 65_{ii}$ . . . Cam
66 . . . Cam follower
7 . . . Bolt supplying mechanism
$8_i, 8_{ii}$ . . . bolt magazine
$9_i, 9_{ii}$ . . . bolt grasping mechanism

BEST MODE FOR CARRYING OUT THE INVENTION

Figure 1:
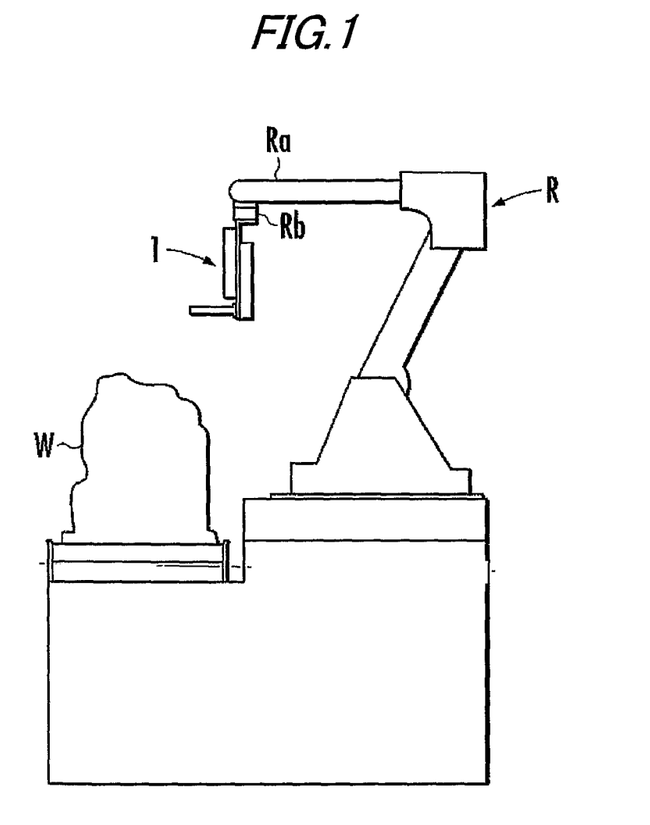
FIG. 1 is a side view showing a working station having a bolt tightening device of an embodiment of the present invention.

FIG. 1 is a view showing a working station in which a plurality of bolts B such as check bolts are tightened to the work W such as a transmission case. Concerning the plurality of bolts B, refer to FIGS. 2 and 4. The robot R is arranged in the side portion of this station. At an acting end of the robot R, that is, at the wrist Rb of the forward end of the robot arm Ra, the tightening head 1, which is a main body of the bolt tightening device, is mounted.

Figure 2:
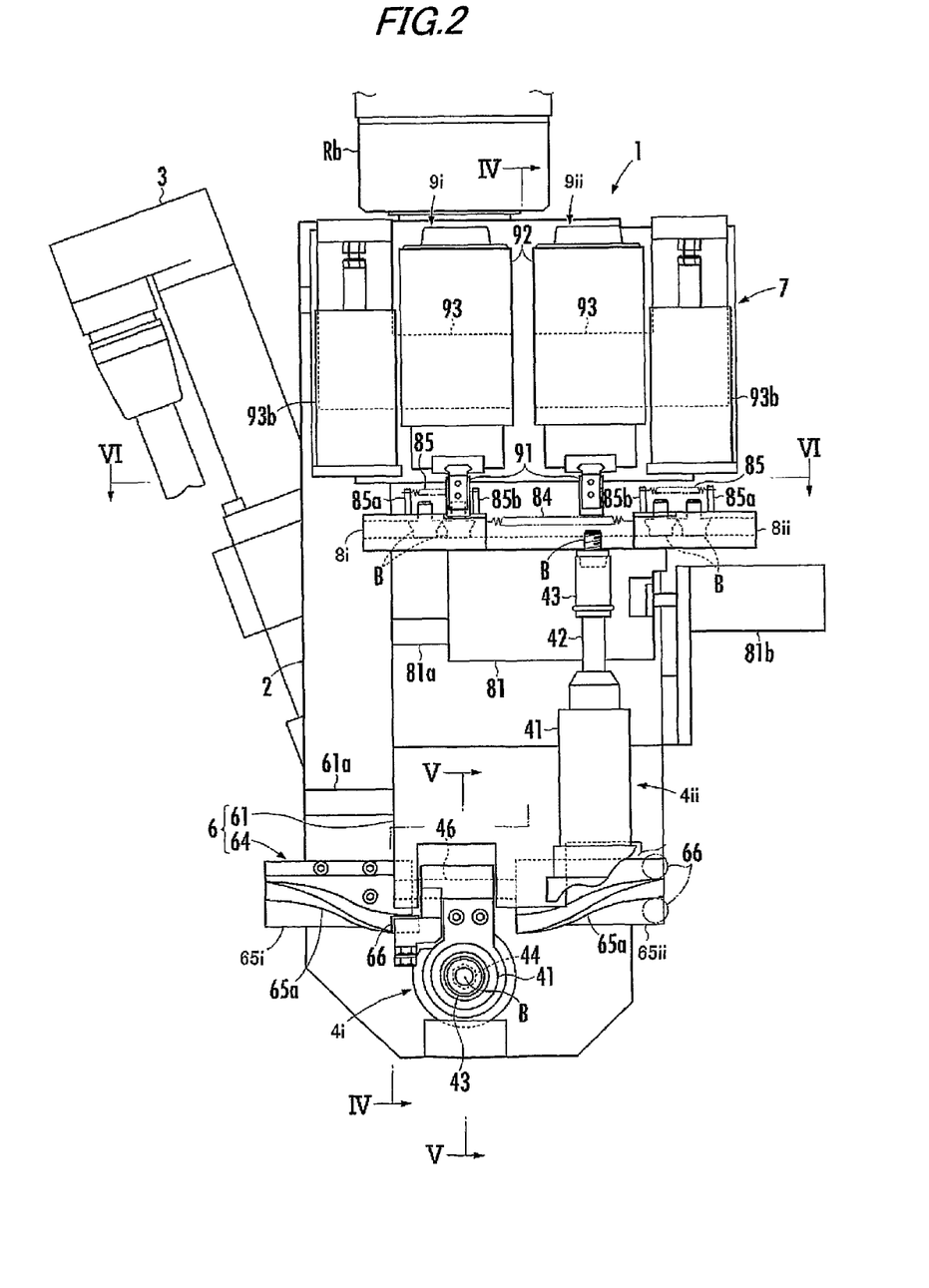
FIG. 2 is a front view of a bolt tightening device of the embodiment of the present invention.
Figure 3:
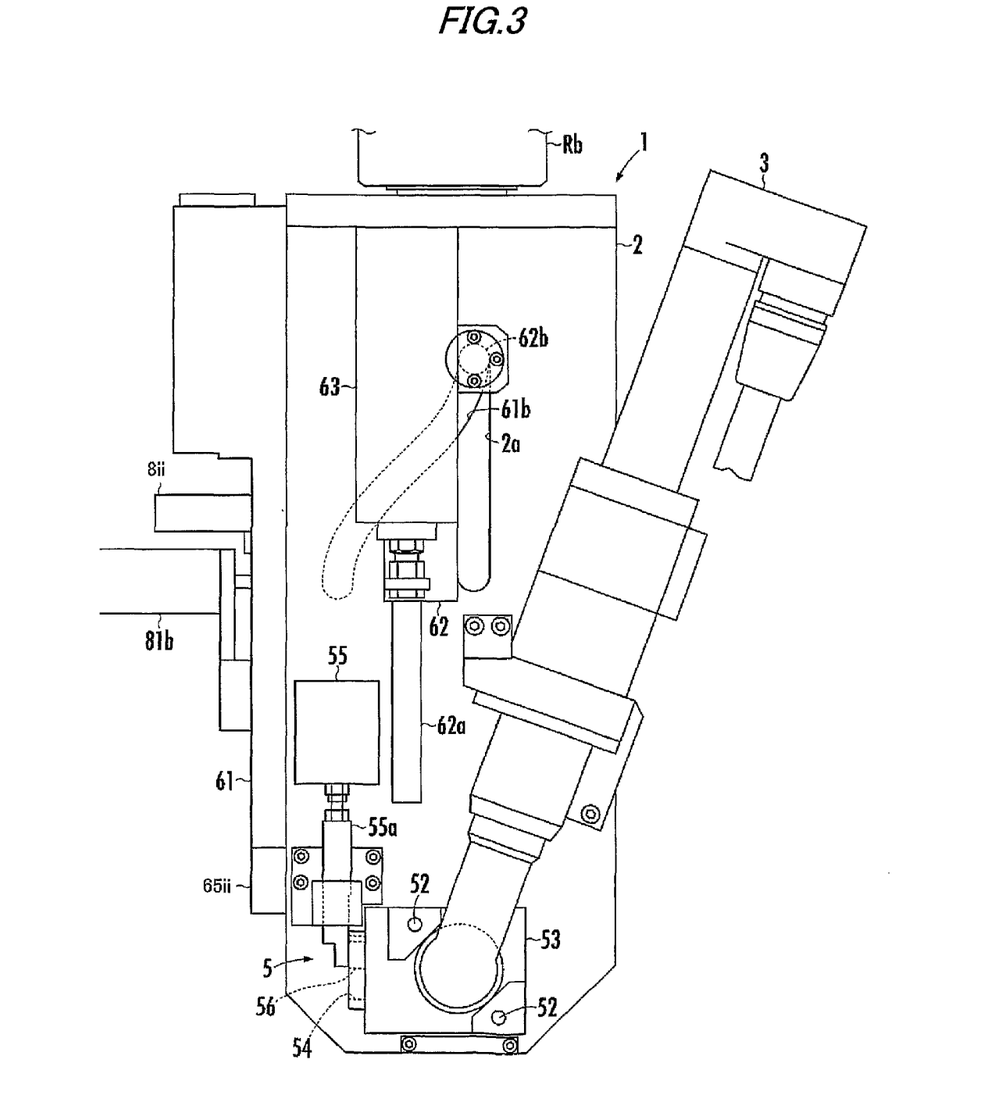
FIG. 3 is a rear view of a bolt tightening device of the embodiment of the present invention.
Figure 4:
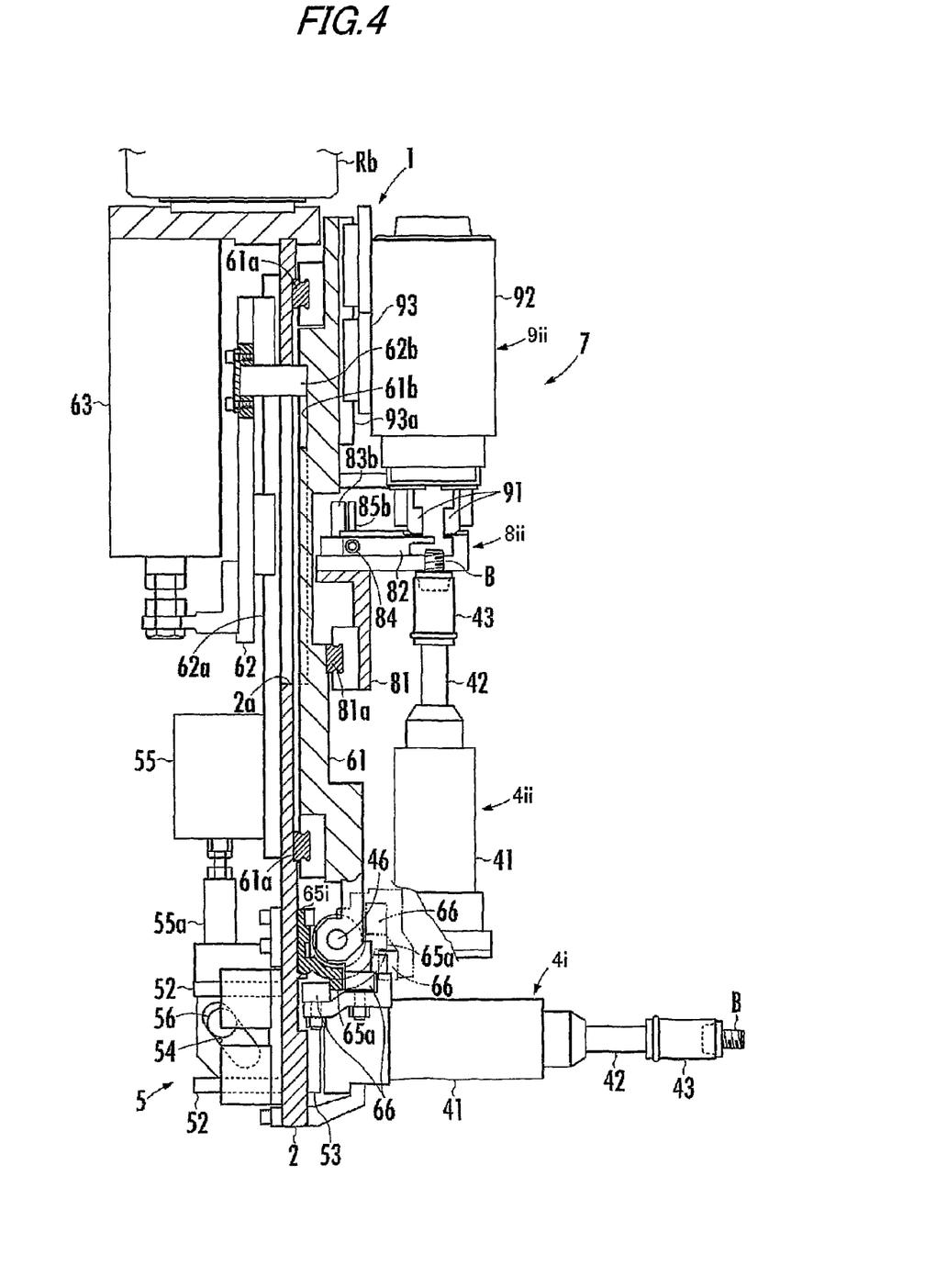
FIG. 4 is a cutaway side view taken on the cutting line IV-IV in FIG. 2.

Referring to FIGS. 2 to 4, the tightening head 1 includes a base 2 which is long in the vertical direction and fixed to the wrist Rb of the robot R. On the back side of the base 2, the nut runner 3 is mounted. At a lower end portion of the nut runner 3, the output shaft 3a, the posture of which is horizontal, is provided. Concerning the output shaft 3a, refer to FIG. 5. The tightening head 1 includes: two sockets $4_i$, $4_{ii}$, one is a first socket and the other is a second socket; an attaching and detaching mechanism 5 for detachably connecting the sockets $4_i$, $4_{ii}$ existing at the using position described later with the output shaft 3a of the nut runner 3; a socket replacing mechanism 6; and a bolt supplying mechanism 7 for supplying bolts B to the sockets $4_i$, $4_{ii}$.

Figure 5:
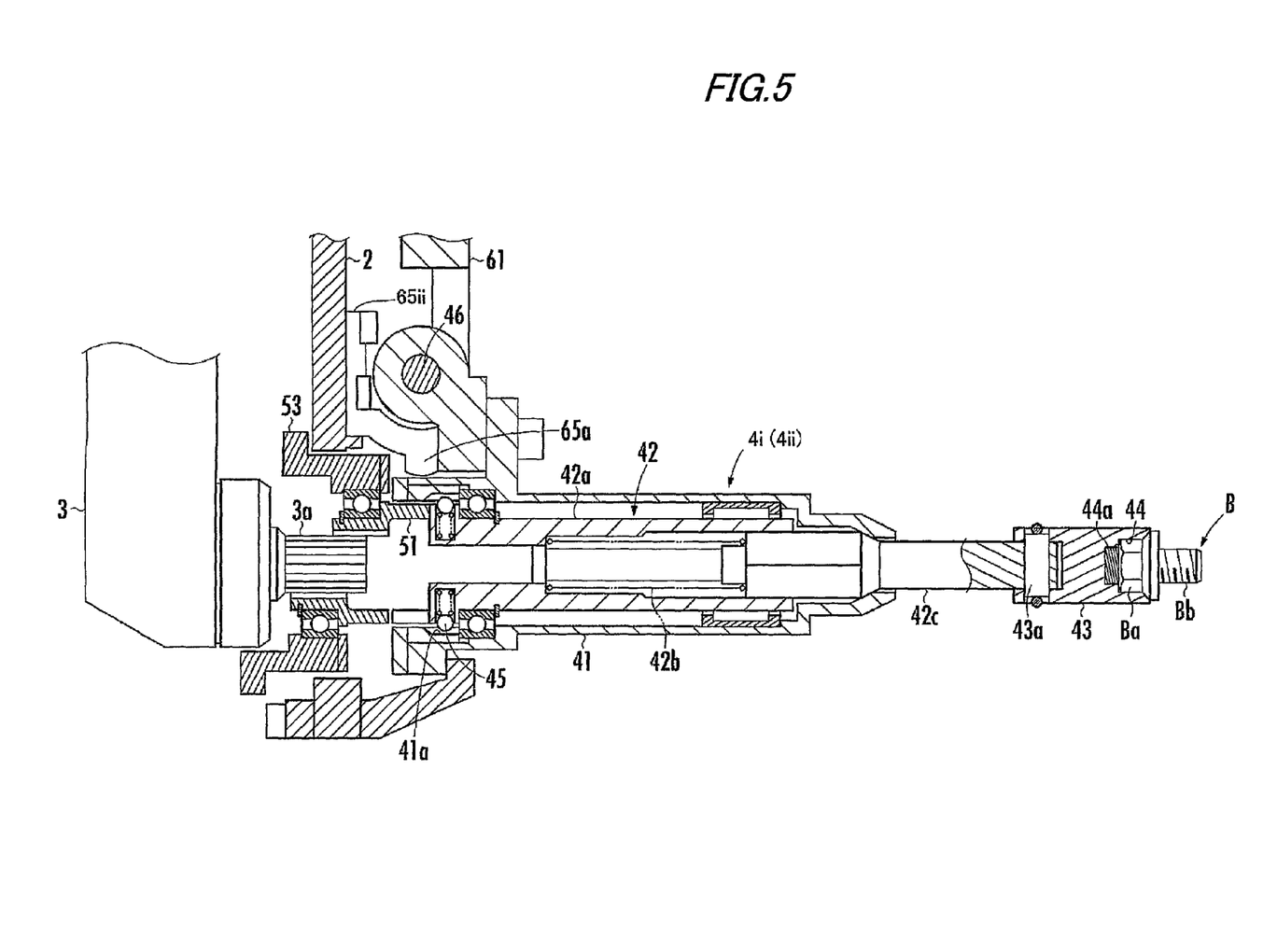
FIG. 5 is a cutaway side view taken on the cutting line V-V in FIG. 2.

As shown in FIG. 5, each socket $4_i$, $4_{ii}$ includes: a sleeve 41; a rotary shaft 42 supported in the sleeve 41; and a socket body 43 connected to a forward end portion of the rotary shaft 42 protruding from the sleeve 41 by the cross pin 43a so that the socket body 43 cannot be relatively rotated. In a forward end portion of the socket body 43, the bolt holding portion 44 is provided which is formed out of a square recess hole for receiving the head portion Ba of the bolt B. In a bottom portion of the bolt holding portion 44, the magnet 44a, which attracts the bolt B, is embedded. The rotary shaft 42 is formed out of a shaft which can be freely expanded and contracted and which includes a shaft portion 42a on the base end side and also includes a shaft portion 42c on the forward end side which is engaged with the shaft portion 42a being pushed in the axial direction by the spring 42b so that the shaft portion 42c can not be relatively rotated. In the base end portion of the rotary shaft 42, the ball plunger 45 is attached which is engaged with the dent portion 41a formed on the inner circumference of the base end portion of the sleeve 41 while leaving an interval in the circumferential direction so that a light braking force can be given to the rotary shaft 42.

As shown in FIG. 5, the attaching and detaching mechanism 5 includes a dog clutch 51 which is outwardly engaged with the output shaft 3a of the nut runner 3 so that the dog clutch 51 can be freely slid in the axial direction being unable to relatively rotate, and this dog clutch 51 can be engaged with a base end of the rotary shaft 42 in the axial direction. The dog clutch 51 is supported by the clutch holder 53 which is supported by the guide pin 52 (shown in FIGS. 3 and 4) protruded on the back face of the lower end portion of the base 2 so that the clutch holder 53 can be freely moved in the axial direction of the output shaft 3a. In the clutch holder 53, the cam groove 54, which is inclined backward toward an upper portion, is provided. This cam groove 54 is engaged with the roller 56 attached to a lower end of the rod 55a which is elevated in the vertical direction by the cylinder 55 mounted on the back face of the base 2. When the roller 56 is moved upward, the clutch holder 53 is advanced through the cam groove 54, and the dog clutch 51 is engaged with the rotary shaft 42 of each socket $4_i$, $4_{ii}$ (the state shown by the upper half portion in FIG. 5), and each socket $4_i$, $4_{ii}$ is connected with the output shaft 3a of the nut runner 3. When the roller 56 is moved downward, the clutch holder 53 moves backward, and the dog clutch 51 is detached from the rotary shaft 42 of each socket $4_i$, $4_{ii}$ (the state shown by the lower half portion in FIG. 5), and the socket $4_i$, $4_{ii}$ is released from the output shaft 3a of the nut runner 3. In this connection, when the clutch holder 53 is advanced, the output shaft 3a of the nut runner 3 is rotated at a low speed. Due to the foregoing, the dog clutch 51 is relatively rotated with respect to the rotary shaft 42 braked by the ball plunger 45 so that the phase can be made to agree. When a predetermined phase agreement is attained, the dog clutch 51 is engaged with the rotary shaft 42.

The socket replacing mechanism 6 includes: a moving mechanism for moving each socket $4_i$, $4_{ii}$ between the using position, at which the socket agrees with the axis of the output shaft 3a of the nut runner 3, and the waiting position which is apart from the axis; and a posture changing mechanism for changing a posture of each socket $4_i$, $4_{ii}$ so that the bolt holding portion 44 can be directed upward at the time of moving to the waiting position and also for changing a posture of each socket $4_i$, $4_{ii}$ so that a posture of the socket can be changed to a tightening posture laid along the axis of the outputting shaft 3a of the nut runner 3 at the time of moving to the using position. In the present embodiment, the moving table 61, which is a component of the moving mechanism, is supported on the front face of the base 2 so that the moving table can be freely reciprocated in the lateral direction perpendicular to the axis of the output shaft 3a of the nut runner 3 laid along the guide rail 61a fixed to the base 2. Each socket $4_i$, $4_{ii}$ is supported being freely oscillated between the upward posture and the tightening posture by the hinge shaft 46 provided at a base end portion of the sleeve 41 of each socket $4_i$, $4_{ii}$.

As shown in FIG. 3, on the back face of the moving table 61, the cam groove 61b is formed which is inclined in the lateral direction and extended in the vertical direction. On the back face of the base 2, the slider 62 is provided which can be freely moved in the vertical direction along the guide rail 62 fixed to the base 61 and the cylinder 63 is also provided which moves the slider 62 in the vertical direction. The pin 62b engaged with the cam groove 61b through the elliptical hole 2a formed in the vertical direction in the base 2 is fixed to the slider 62. When the slider 62 is moved downward, the moving table 61 is moved in one direction of the lateral direction (to the left in FIG. 2) through the pin 62b and the cam groove 61b. When the slider 62 is moved upward, the moving table 61 is moved in the other direction of the lateral direction (to the right in FIG. 2). When the moving table 61 is moved forward, the first socket $4_i$ is moved to the waiting position apart from the axis of the output shaft 3a of the nut runner 3 to one side (to the left). At the same time, the second socket $4_{ii}$ is moved to the using position. When the moving table 61 is moved backward, the first socket $4_i$ is moved to the using position. At the same time, the second socket is moved to the waiting position (the position shown in FIG. 2) apart from the axis of the output shaft 3a of the nut runner 3 to the other side (to the right). In the present embodiment, the moving mechanism includes the moving table 61, the slider 62 and the cylinder 63.

The posture changing mechanism is formed out of a cam mechanism 64. The cam mechanism 64 includes: a pair of the first and second cams $65_i$, $65_{ii}$, which correspond to the first and second sockets $4_i$, $4_{ii}$, fixed to a front face lower portion of the base 2; and a cam follower 66, which is engaged with each cam $65_i$, $65_{ii}$, connected to a base end of the sleeve 41 of each socket $4_i$, $4_{ii}$. Each cam $65_i$, $65_{ii}$ has a rail 65a spirally extending in the lateral direction along a virtual cylindrical face formed round the hinge shaft 46 of each socket $4_i$, $4_{ii}$. The rail 65a protrudes downward from the virtual cylindrical face at an inner end in the lateral direction. The rail 65a protrudes forward from the virtual cylindrical face at an outer end in the lateral direction. The cam follower 66 is configured of a pair of rollers which are engaged with the cam 65 so that the rail 65a can be pinched by the rollers. When the cam follower 66 pinches a portion of the rail 65a protruding downward from the virtual cylindrical face, each socket $4_i$, $4_{ii}$ is put into a tightening posture. When the cam follower 66 pinches a portion of the rail 65a protruding forward from the virtual cylindrical face, each socket $4_i$, $4_{ii}$ is put into an upward posture. When the moving table 61 is moved forward to the left in FIG. 2, while the first socket $4_i$ is moving from the using position to the left waiting position, a posture of the first socket $4_i$ is changed from the tightening posture to the upward posture by the first cam $65_i$. At the same time, while the second socket $4_{ii}$ is moving from the right waiting position to the using position, a posture of the second socket $4_{ii}$ is changed from the upward posture to the tightening posture by the second cam $65_{ii}$. When the moving table 61 is moved to the right in FIG. 2, while the first socket $4_i$ is moving from the left waiting position to the using position, a posture of the first socket $4_i$ is changed from the upward posture to the tightening posture by the first cam $65_i$. At the same time, while the second socket $4_{ii}$ is moving from the using position to the right waiting position, a posture of the second socket $4_{ii}$ is changed from the tightening posture to the upward posture by the second cam $65_{ii}$.

The bolt supplying mechanism 7 includes: a pair of the first and second bolt magazines $8_i$, $8_{ii}$ corresponding to the first and second sockets $4_i$, $4_{ii}$; and a pair of the first and second bolt grasping mechanism $9_i$, $9_{ii}$. On the front face of the moving table 61, the slide plate 81 is provided which is reciprocated in the lateral direction by the cylinder 81b along the guide rail 81a fixed to the moving table 61. Both bolt magazines $8_i$, $8_{ii}$ are attached at a predetermined interval to the slide plate 81 in the lateral direction in a portion higher than the bolt holding portion 44 of the socket $4_i$, $4_{ii}$, the posture of which is directed upward.

Figure 6:
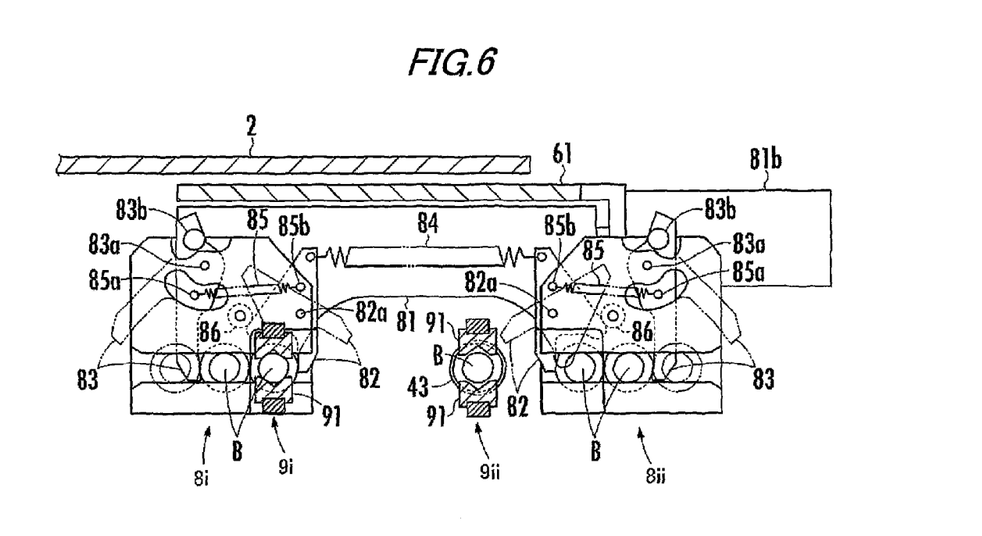
FIG. 6 is a cutaway plan view taken on the cutting line VI-VI in FIG. 2.

As shown in FIG. 6, each bolt magazine $8_i$, $8_{ii}$ is configured so that it can hold a plurality of bolts B (three bolts B in the example shown in the drawing) which are arranged in one lateral line. Each bolt magazine $8_i$, $8_{ii}$ includes: a discharging pawl 82 arranged in an inner portion in the lateral direction; and a charging pawl 83 arranged in an outer portion in the lateral direction. The discharging pawl 82 and the charging pawl 83 are respectively freely oscillated in the lateral direction round the shafts 82a, 83a. The tension spring 84 is provided between the discharging pawls 82, 82 of both bolt magazines $8_i$, $8_{ii}$. By this tension spring 84, the discharging pawl 82 is pushed and held at a closing position regulated by the stopper pin 86. Therefore, the bolts B are prevented from falling off from each bolt magazine $8_i$, $8_{ii}$ to an inner portion in the lateral direction by the discharging pawl 82.

Under the condition that the bolt B, which is located on the most inner side in the lateral direction coming into contact with the discharging pawl 82, is grasped by the bolt grasping mechanism $9_i$, $9_{ii}$ as described later, each bolt magazine $8_i$, $8_{ii}$ is moved outside in the lateral direction. While this bolt B is pushing and opening the discharging pawl 82 inside in the lateral direction, the bolt B is drawn out inside in the lateral direction from each bolt magazine $8_i$, $8_{ii}$.

The charging pawl 83 is pushed and oscillated inside in the lateral direction by the tension spring 85 provided between the pin 85a, which is perpendicularly arranged in the charging pawl 83, and the pin 85b which is perpendicularly arranged in an upper plate portion of each bolt magazine $8_i$, $8_{ii}$. When the bolt B located on the most inner side in the lateral direction of each bolt magazine $8_i$, $8_{ii}$ is drawn out, the bolt B in each bolt magazine $8_i$, $8_{ii}$ is pushed by the charging pawl 83 inside in the lateral direction to a position where the bolt B comes into contact with the charging pawl 82 which is oscillated and returned to the closing position. In the charging pawl 83, the operation pin 83b is perpendicularly arranged. After a plurality of bolts B are tightened to the work W, the tightening head 1 is moved to a predetermined bolt supplying position by an action of the robot R. At this time, the charging pawl 83 is oscillated to an open position outside in the lateral direction through the operation pin 83b. In this state, a plurality of bolts B are supplied from a parts feeder (not shown) to each bolt magazine $8_i$, $8_{ii}$.

Figure 7:
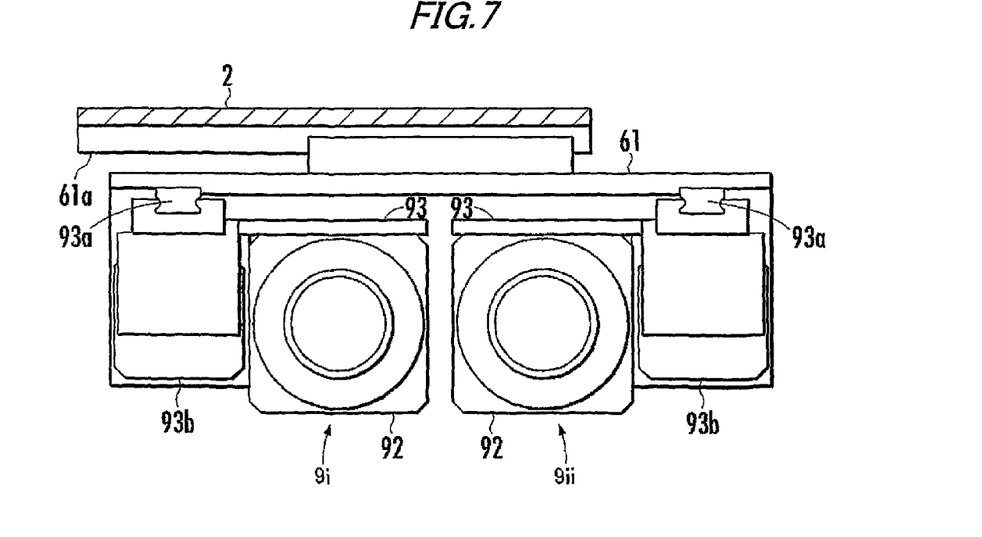
FIG. 7 is a plan view showing an arrangement portion of a bolt grasping mechanism of a bolt tightening device of the embodiment.

Referring to FIGS. 2, 4 and 7, the first and second bolt grasping mechanisms $9_i$, $9_{ii}$ include: a pair of grasping pawls 91, 91 capable of grasping the shaft portion Bb of the bolt B; and actuators 92 which open and close the grasping pawls 91, 91 and further rotate the grasping pawls 91, 91 at a low speed. A pair of elevating frames 93, 93 are provided which are elevated in the vertical direction by the cylinders 93b along the guide rails 93a fixed to the right and left side portions in the front face upper portion of the moving table 61. On the elevating frames 93, the bolt grasping mechanism $9_i$, $9_{ii}$ are mounted. With respect to the moving table 61, at the same position in the lateral direction as that of the first socket $4_i$, the first bolt grasping mechanism $9_i$ is vertically moved. With respect to the moving table 61, at the same position in the lateral direction as that of the second socket $4_{ii}$, the second bolt grasping mechanism $9_{ii}$ is vertically moved. Due to the above structure, in the case where the first socket $4_i$ is moved to the left waiting position and the posture is directed upward when the moving table 61 moves forward to the left in FIG. 2, the first bolt grasping mechanism $9_i$ is linearly moved in the vertical direction under the condition that a center (a holding center) between the grasping pawls 91, 91 is located on the same line as that of the axis of the first socket $4_i$. In the case where the second socket $4_{ii}$ is moved to the right waiting position and the posture is directed upward when the moving table 61 moves backward to the right in FIG. 2, the second bolt grasping mechanism $9_{ii}$ is linearly moved in the vertical direction under the condition that a center (a holding center) between the grasping pawls 91, 91 is located on the same line as that of the axis of the second socket $4_{ii}$.

Next, a procedure of tightening the bolt B to the work W executed by the bolt tightening device of the present embodiment will be explained below, wherein the starting point of the explanation is the state shown in FIG. 2. FIG. 2 shows a step in which one bolt B is being tightened by the first socket $4_i$. In the step shown in FIG. 2, the posture of the second socket $4_{ii}$ is directed upward and the second socket $4_{ii}$ is located at the right waiting position. By the second bolt grasping mechanism $9_{ii}$, the bolt B has been inserted into the bolt holding portion 44 of the second socket $4_{ii}$ by the second bolt grasping mechanism $9_{ii}$.

When the tightening step of tightening the bolt B by the first socket $4_i$ is completed, the bolt supplying preparing step for the first socket $4_{ii}$ and the bolt tightening preparing step for the second socket $4_{ii}$ are simultaneously carried out. In this step, first of all, the clutch holder 53 is moved backward so as to disconnect the dog clutch 51 from the rotary shaft 42 of the first socket $4_i$ and release a connection of the first socket $4_i$ with the output shaft 3a of the nut runner 3. Next, the moving table 61 is moved forward to the left in FIG. 2. Due to the foregoing, while the first socket $4_i$ is moving to the left waiting position, the posture of the first socket is changed to an upward posture. At the same time, while the second socket $4_{ii}$ is moving to the using position, the posture of the second socket is changed to a tightening posture. When the second socket $4_{ii}$ has reached the using position in the tightening posture, the clutch holder 53 is moved forward so as to engage the dog clutch 51 with the rotary shaft 42 of the second socket $4_{ii}$ and connect the second socket $4_{ii}$ with the output shaft 3a of the nut runner 3.

When the bolt tightening preparing step for the second socket $4_{ii}$ is completed as described above, the second socket $4_{ii}$ is rotated by the nut runner 3 and the bolt tightening step is carried out in which the bolt B held by the bolt holding portion 44 of the second socket $4_{ii}$ is tightened to the work W.

While keeping pace with the above step, the bolt supplying step of supplying a bolt to the first socket $4_i$ is carried out. This bolt supplying step includes: a bolt holding preparing step in which the slide plate 81 is moved to the right with respect to the moving table 61 and in the first bolt magazine $8_i$, the bolt B, which is located on the most inner side in the lateral direction in the magazine $8_i$ concerned, is moved to a bolt delivering position where the bolt B can be grasped by the first bolt grasping mechanism $9_i$; a bolt grasping step in which the bolt B, which is located on the most inner side in the lateral direction in the first bolt magazine $8_i$, is grasped by the grasping pawls 91, 91 of the first bolt grasping mechanism $9_i$; a magazine withdrawal step in which the sliding plate 81 is moved to the left with respect to the moving table 61 and the first bolt magazine $8_i$ is moved to a withdrawal position separate outside (to the left) in the lateral direction from a moving locus of the first bolt grasping mechanism $9_i$ directed to a lower portion of the grasping pawls 91, 91; a bolt insertion step in which the first bolt grasping mechanism $9_i$ is moved downward and the head portion Ba of the bolt B is inserted from an upper portion into the bolt holding portion 44 of the first socket $4_i$, the posture of which is directed upward, located at the waiting position; and a returning step in which the grasping pawls 91, 91 of the first bolt grasping mechanism $9_i$ are opened and the first bolt grasping mechanism $9_i$ is returned to an upper position. In this connection, in the magazine withdrawal step, the most inner side bolt B in the lateral direction in the first bolt magazine $8_i$ held by the grasping pawls 91, 91 of the first bolt grasping mechanism $9_i$ is drawn out from the magazine $8_i$ concerned. In the bolt insertion step, the grasping pawl 91, 91 of the first bolt grasping mechanism $9_i$ is rotated at a low speed so that a phase of the bolt head portion Ba can be made to agree with that of the bolt holding portion 44 and the bolt can be inserted into it.

In this case, the bolt holding preparing step, the bolt grasping step and the magazine withdrawal step are carried out in a period of time from the mean time of the bolt tightening step executed by the first socket $4_i$ to the completion of the bolt supplying preparing step executed for the first socket $4_i$. Right after the bolt supplying preparing step has been completed, the bolt insertion step is carried out. Due to the foregoing, before the bolt tightening step executed by the second socket $4_{ii}$ is completed, the bolt B can be surely supplied to the first socket $4_i$.

After the bolt tightening step executed by the second socket $4_{ii}$ has been completed, the bolt supplying preparing step for the second socket $4_{ii}$ and the bolt tightening step for the first socket $4_i$ are simultaneously carried out. In this step, first of all, the clutch holder 53 is withdrawn and the clutch 51 is disconnected from the rotary shaft 42 of the second socket $4_{ii}$ and a connection of the second socket $4_{ii}$ with the output shaft $3a$ of the nut runner 3 is released. Next, the moving table 61 is returned to the right in FIG. 2. Due to the foregoing, while the second socket $4_{ii}$ is moving to the right waiting position, a posture of the second socket $4_{ii}$ is changed into an upward posture. At the same time, while the first socket $4_i$ is being moved to the using position, a posture of the first socket $4_i$ is changed into a tightening posture. When the first socket $4_i$ has arrived at the using position while the posture is being kept in the tightening posture, the clutch holder 53 is advanced and the dog clutch 51 is engaged with the rotary shaft 42 of the first socket $4_i$ so that the first socket $4_i$ and the output shaft $3a$ of the nut runner 3 can be connected to each other.

After the bolt tightening step for the first socket $4_i$ has been completed in this way, the first socket $4_i$ is rotated by the nut runner 3, the bolt tightening step is carried out in which the bolt B held by the bolt holding portion 44 of the first socket $4_i$ is tightened to the work W.

While keeping pace with the above step, the bolt supplying step for the second socket $4_{ii}$ is carried out. This bolt supplying step includes: a bolt holding preparing step in which the slide plate 81 is moved to the left with respect to the moving table 61 and in the second bolt magazine $8_{ii}$, the bolt B, which is located on the most inner side in the lateral direction in the magazine $8_{ii}$ concerned, is moved to a bolt delivering position where the bolt B can be grasped by the second bolt grasping mechanism $9_{ii}$; a bolt grasping step in which the bolt B, which is located on the most inner side in the lateral direction in the second bolt magazine $8_{ii}$, is grasped by the grasping pawls 91, 91 of the second bolt grasping mechanism $9_{ii}$; a magazine withdrawal step in which the sliding plate 81 is moved to the right with respect to the moving table 61 and the second bolt magazine $8_{ii}$ is moved to a withdrawal position separate outside (to the right) in the lateral direction second bolt grasping mechanism $9_{ii}$ directed to a lower portion of the grasping pawls 91, 91; a bolt insertion step in which the second bolt grasping mechanism $9_{ii}$ is moved downward and the head portion Ba of the bolt B is inserted from an upper portion into the bolt holding portion 44 of the second socket $4_{ii}$, the posture of which is directed upward, located at the waiting position; and a returning step in which the grasping pawls 91, 91 of the second bolt grasping mechanism $9_{ii}$ are opened and the second bolt grasping mechanism $9_{ii}$ is returned to an upper position.

In this case, the bolt holding preparing step, the bolt grasping step and the magazine withdrawal step are carried out in a period of time from the mean time of the bolt tightening step executed by the second socket $4_{ii}$ to the completion of the bolt supplying preparing step executed for the second socket $4_{ii}$. Right after the bolt supplying preparing step has been completed, the bolt insertion step is carried out. Due to the foregoing, before the bolt tightening step executed by the first socket $4_i$ is completed, the bolt B can be surely supplied to the second socket $4_{ii}$. A series of steps are repeated so as to tighten a plurality of bolts B to the work W.

According to the tightening method of the present embodiment, in the bolt tightening step in which one of the first and the second socket $4_i$, $4_{ii}$ tightens the bolt, the bolt B can be supplied to the other socket. Further, after the completion of the bolt tightening step, one socket connected to the output shaft $3a$ of the nut runner 3 is moved from the using position to the waiting position. At the same time, the other socket is moved from the waiting position to the using position. Therefore, the socket can be efficiently replaced. Due to the foregoing, a tightening cycle time of tightening one bolt can be shortened and a plurality of bolts B can be efficiently tightened to the work W.

Even when a tightening posture of the socket is a horizontal posture or a downward posture in which it is difficult for the bolt B to be stably supplied to the bolt holding portion 44 at a forward end of the socket, when a posture of the socket $4_i$, $4_{ii}$ is changed into an upward posture, the bolt B can be stably inserted from an upper portion of the bolt holding portion 44 of the forward end of the socket into the socket. Accordingly, it is possible to eliminate a time loss caused by a failure of supplying the bolt. Further, it is unnecessary to arrange an auxiliary device for supplying the bolt in the neighborhood of the forward end of the socket connected to the output shaft $3a$ of the nut runner 3. Therefore, it is possible to prevent the occurrence of a problem in which the bolt can not be tightened because of the interference of the auxiliary device with the work W.

When each bolt magazine $8_i$, $8_{ii}$ can be freely moved between the bolt delivering position and the withdrawal position, only when each bolt grasping mechanism $9_i$, $9_{ii}$ is linearly moved in the vertical direction, the bolt B can be inserted into the bolt holding portion 44 of each socket $4_i$, $4_{ii}$ without causing interference with each bolt magazine $8_i$, $8_{ii}$. Therefore, as compared with a case in which each bolt grasping mechanism $9_i$, $9_{ii}$ is moved in a direction except for the vertical direction so as to avoid the interference with the bolt magazine $8_i$, $8_{ii}$, the positional accuracy of the bolt grasping mechanism $9_i$, $9_{ii}$ can be easily ensured and the bolt B can be stably, positively supplied to each socket $4_i$, $4_{ii}$.

The first and the second bolt magazine $8_i$, $8_{ii}$ are connected to each other through the slide plate 81. Simultaneously when one of the bolt magazines $8_i$, $8_{ii}$ is moved to the bolt delivery position, the other bolt magazine $8_i$, $8_{ii}$ is moved to the withdrawal position. That is, the bolt holding preparing step in the bolt supplying step for one of the first and the second socket $4_i$, $4_{ii}$ and the magazine withdrawal step in the bolt supplying step for the other socket are simultaneously carried out. These steps can be carried out before the bolt tightening preparing step for one socket and the bolt supplying preparing step for the other socket are finished. Right after the bolt tightening preparing step and the bolt supplying preparing step have been finished, the bolt grasping step in the bolt supplying step for one socket and the bolt insertion step in the bolt supplying step for the other socket can be simultaneously carried out. Due to the foregoing, a cycle time of tightening a bolt can be further shortened.

The embodiment of the present invention has been explained above referring to the drawings. However, it should be note that the present invention is not limited to the above specific embodiment. For example, in the above embodiment, in the bolt supplying preparing step, a posture of each socket $4_i$, $4_{ii}$ is set at an upward posture in which the bolt holding portion 44 is directed right upward in the perpendicular direction and each bolt grasping mechanism $9_i$, $9_{ii}$ can be freely linearly moved in the vertical direction. However, in the upward posture of each socket $4_i$, $4_{ii}$ of the present invention, it is sufficient that the bolt holding portion 44 is directed substantially upward, that is, the bolt holding portion 44 may be inclined with respect to the perpendicular direction. In the same manner, concerning the vertical direction which is a direction of the linear movement of each bolt grasping mechanism $9_i$, $9_{ii}$, it is sufficient that the bolt B can be inserted into the bolt holding portion 44 of each socket $4_i$, $4_{ii}$ by the linear movement of each bolt grasping mechanism $9_i$, $9_{ii}$, that is, the direction is not limited to the perpendicular direction. The tightening posture of each socket $4_i$, $4_{ii}$ is not limited to the horizontal posture described in the above embodiment. For example, the tightening posture of each socket $4_i$, $4_{ii}$ may be a downward posture.

In the above embodiment, two sockets $4_i$, $4_{ii}$ are used, however, the number of sockets is not limited to two, that is, the number of sockets may be one or three or more. In the case where the number of sockets is one, it is unnecessary to move the socket to the waiting position apart from the axis of the output shaft 3a of the nut runner 3. Accordingly, it is sufficient that the socket is changed between the tightening posture and the upward posture at a position where the socket agrees with the axis of the output shaft 3a of the nut runner 3.

In the above embodiment, the first and the second bolt grasping mechanism $9_i$, $9_{ii}$ are provided on the moving table 61. However, the first and the second bolt grasping mechanism $9_i$, $9_{ii}$ may be provided on the base 2 so that they can be linearly moved in the vertical direction at the same position as the waiting position in the lateral direction of the first and the second socket $4_i$, $4_{ii}$. In this case, the device may be configured as follows. The first and the second bolt magazine $8_i$, $8_{ii}$ are fixed onto the moving table 61. When the moving table 61 is moved forward to the left, the first bolt magazine $8_i$ is moved to the withdrawal position and the second bolt magazine $8_{ii}$ is moved to the bolt delivering position. When the moving table 61 is moved backward to the right, the first bolt magazine $8_i$ is moved to the bolt delivering position and the second bolt magazine $8_{ii}$ is moved to the withdrawal position.

In the above embodiment, the bolt magazines $8_i$, $8_{ii}$ and the bolt grasping mechanism $9_i$, $9_{ii}$ are mounted on the tightening head 1. However, the following constitution may be employed.

The bolt magazine and the bolt grasping mechanism are arranged at predetermined bolt supplying positions and the tightening head 1 is moved to the bolt supplying position so that the socket can be directed upward, and the bolt can be inserted into the bolt holding portion at the forward end of the socket from the bolt grasping mechanism.

In the above embodiment, the posture changing mechanism for the socket is formed out of the cam mechanism 64. However, the posture changing mechanism for the socket may be formed out of a mechanism of rotating the hinge shaft 46 of each socket $4_i$, $4_{ii}$. However, in this case, it is necessary to provide a drive source for driving the posture changing mechanism in addition to the cylinder 63 which is a drive source for driving the moving mechanism (the moving table 61). On the other hand, when the posture changing mechanism is formed out of the cam mechanism 64, it is unnecessary to provide the drive source for driving the posture changing mechanism. Therefore, the manufacturing cost can be advantageously reduced.

In the above embodiment, the bolt supplying mechanism 7 includes: bolt magazines $8_i$, $8_{ii}$; and bolt grasping mechanism $9_i$, $9_{ii}$. However, it is possible to compose the bolt supplying mechanism 7 in such a manner that a bolt is dropped from a parts feeder to the bolt holding portion of the socket, which is located at the waiting position, through a tube.

It is possible to integrate the moving mechanism of the socket replacing mechanism 6 with the posture changing mechanism into one body. For example, in the tightening head 1, a rotary table is provided which is rotated round an equiangular bisection line formed between the axis of the output shaft 3a of the nut runner 3 and the vertical line crossing the axis. Then, a plurality of sockets are mounted on this rotary table so that the axis of each socket can be inclined with respect to the equiangular bisection line by a half angle of the angle formed between the axis of the output shaft 3a of the nut runner 3 and the vertical line described before. Due to the above constitution, the socket, which is located at the using position agreeing with the axis in a tightening posture laid along the axis of the output shaft 3a of the nut runner 3, can be moved to the waiting position distant upward from the axis of the output shaft 3a by a rotation, the angle of which is 180°, of the rotary table. Due to the foregoing, the moving mechanism of the socket replacing mechanism 6 and the posture changing mechanism can be integrated with each other by the rotary table. In this case, the waiting positions of the sockets are the same. Therefore, bolts can be supplied to a plurality of sockets by one bolt magazine and bolt grasping mechanism.

Concerning the work W, the transmission case is exemplarily shown in the embodiment described before. However, it is possible to apply the present invention to another case in which a plurality of bolts are tightened to a work except for the transmission case. For example, the present invention can be applied to a case in which auxiliary devices such as a starter are mounted on an engine block by using bolts. The present invention can be also applied to a case in which parts for chassis such as a damper and a suspension arm are mounted on an automobile body by using a plurality of bolts. In the neighborhood of the bolt tightening positions in the work, vacant spaces are seldom left. Accordingly, the present invention, in which no auxiliary devices for supplying bolts are arranged in the neighborhood of the forward end portion of the socket connected to the output shaft of the nut runner, is suitably used for the bolt tightening work.

While description has been made in connection with specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

INDUSTRIAL APPLICABILITY

The present invention is applicable to a method and a device for tightening bolts for tightening a plurality of bolts to a work.

The invention claimed is:

1. A method of tightening bolts in which a plurality of bolts are tightened to a work by using a tightening head on which a nut runner is mounted, the method comprising:
a bolt supplying preparing step of releasing a connection between a socket portion and an output shaft of the nut runner, and changing a posture of the socket portion to an upward posture in which a bolt holding portion provided at a forward end of the socket portion directs upward;
a bolt supplying step of grasping one of the plurality of bolts held in a bolt magazine mounted on the tightening head by a bolt grasping mechanism mounted on the tightening head, and inserting the one of bolts from an upper side into the bolt holding portion of the socket portion by the bolt grasping mechanism, after the bolt supplying preparing step;
a bolt tightening preparing step of changing the posture of the socket portion to a tightening posture in which the socket portion is laid along an axis of the output shaft of the nut runner, and connecting the socket portion with the output shaft of the nut runner, after a completion of the bolt supplying step; and
a bolt tightening step of rotating the socket portion by the nut runner, and tightening the bolt held by the bolt holding portion of the socket portion to the work, after a completion of the bolt tightening preparing step.

2. The method according to claim 1, wherein the socket portion includes at least two sockets provided in the tightening head, and the two sockets are capable of alternatively being connected to the output shaft of the nut runner, the method further comprising:
executing one cycle of working steps in order with respect to each socket, wherein the one cycle includes the bolt preparing step, the bolt supplying step, the bolt tightening preparing step and the bolt tightening step;
changing a posture of each socket to the upward posture, while each socket is moving to a waiting position apart from an axis of the output shaft of the nut runner, in the bolt supplying preparing step for each socket;
changing the posture of each socket to the tightening posture, while each socket is moving from the waiting position to a using position agreeing with the axis of the output shaft of the nut runner, in the bolt tightening preparing step for each socket; and
simultaneously executing the bolt supplying preparing step for one socket and the bolt tightening preparing step for another socket.

3. The method according to claim 2, wherein the sockets have respective waiting positions, and the sockets have respective bolt magazines and the bolt grasping mechanisms on the tightening head,
the bolt supplying step for each socket including:
a bolt holding preparing step of moving each bolt magazine corresponding to the each socket to a bolt delivering position at which one of the plurality of bolts held by the magazine is grasped by each bolt grasping mechanism corresponding to the each socket;
a bolt grasping step of grasping the bolt by the each bolt grasping mechanism;
a magazine withdrawal step of moving the each bolt magazine to a withdrawal position apart from a downward moving locus of the each bolt grasping mechanism; and
a bolt insertion step of moving the each bolt grasping mechanism downward and inserting the bolt into a bolt holding portion of the each socket existing at each waiting position.

4. The method according to claim 3, further comprising:
simultaneously executing the bolt holding preparing step in the bolt supplying step for one socket and the magazine withdrawal step in the bolt supplying step for another socket.

5. The method according to claim 4, further comprising:
simultaneously executing the bolt grasping step in the bolt supplying step for one socket and the bolt insertion step in the bolt supplying step for another socket.

6. A method of tightening bolts for tightening a plurality of bolts to a work by using at least two sockets which are alternatively connected to an output shaft of a nut runner, the method comprising:
a bolt supplying preparing step including:
releasing a socket connected to the output shaft of the nut runner from the output shaft of the nut runner;
moving the socket to a waiting position apart from an axis of the output shaft of the nut runner and
changing a posture of the socket to an upward posture in which a bolt holding portion of a forward end of the socket directs upward;
a bolt tightening preparing step including:
moving the socket to a using position agreeing with the axis of the output shaft of the nut runner;
changing the posture of the socket to a tightening posture in which the socket is laid along the axis; and
connecting the socket to the output shaft of the nut runner; and
simultaneously executing the bolt supplying preparing step for one socket and the bolt tightening preparing step for another socket.

7. The method according to claim 6, further comprising:
a bolt supplying step of supplying the bolt from an upper side to the bolt holding portion of the socket at the waiting position, after a completion of the bolt supplying preparing step; and
a bolt tightening step of rotating the socket by the nut runner and of tightening the bolt held by the socket holding portion to the work, after a completion of the bolt tightening preparing step.

8. A method of tightening bolts, the method comprising the steps of:
a bolt supplying preparing step of changing a posture of a socket from a predetermined tightening posture to an upward posture in which a bolt holding portion provided at a forward end of the socket directs upward; and a bolt supplying step of grasping one of a plurality of bolts held by a bolt magazine arranged at a position higher than the bolt holding portion of the socket in the upward posture, and inserting the bolt into the bolt holding portion of the socket, wherein the bolt supplying step includes:
- a bolt holding preparing step of moving the bolt magazine to a bolt delivering position where one of the plurality of bolts held by the magazine can be grasped by the bolt grasping mechanism;
- a bolt grasping step of grasping the bolt by the bolt grasping mechanism;
- a magazine withdrawal step of moving the bolt magazine to a withdrawal position apart from a downward moving locus of the bolt grasping mechanism; and
- a bolt insertion step of moving the bolt grasping mechanism downward and inserting the bolt from an upper side into the bolt holding portion of the socket in the upward posture, after a completion of the bolt supplying preparing step.

* * * * *